United States Patent
Wächtler et al.

(10) Patent No.: US 12,378,997 B2
(45) Date of Patent: Aug. 5, 2025

(54) INNER-RING-FASTENED ROLLER SLEEVE AND METHOD FOR PRODUCING SAME

(71) Applicant: Schaeffler Technologies AG & Co. KG, Herzogenaurach (DE)

(72) Inventors: Stefan Wächtler, Herzogenaurach (DE); Robert Dressel, Gremsdorf (DE); Alfred Hock, Höchstadt / Aisch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 123 days.

(21) Appl. No.: 18/018,385

(22) PCT Filed: Jul. 15, 2021

(86) PCT No.: PCT/DE2021/100622
§ 371 (c)(1),
(2) Date: Jan. 27, 2023

(87) PCT Pub. No.: WO2022/037744
PCT Pub. Date: Feb. 24, 2022

(65) Prior Publication Data
US 2023/0296135 A1    Sep. 21, 2023

(30) Foreign Application Priority Data
Aug. 20, 2020  (DE) .................... 10 2020 121 839.7

(51) Int. Cl.
F16C 33/46    (2006.01)
F16C 19/26    (2006.01)
F16C 33/58    (2006.01)

(52) U.S. Cl.
CPC .......... *F16C 33/4605* (2013.01); *F16C 19/26* (2013.01); *F16C 33/583* (2013.01)

(58) Field of Classification Search
CPC .... F16C 33/4605; F16C 33/588; F16C 33/64; F16C 2220/42
See application file for complete search history.

(56) References Cited

U.S. PATENT DOCUMENTS 2,721,775 A    10/1955  Nusbaum
9,382,947 B2*  7/2016  Ishibashi ............. F16C 33/4694
(Continued)

FOREIGN PATENT DOCUMENTS

DE    19513668 A1    10/1996
DE    102011007458 A1    10/2012
(Continued)

*Primary Examiner* — John Olszewski
*Assistant Examiner* — Aimee Tran Nguyen
(74) *Attorney, Agent, or Firm* — Matthew V. Evans

(57) ABSTRACT

An inner-ring-fastened roller sleeve includes an inner ring and a roller-and-cage assembly. The inner ring is arranged for fastening on a shaft or axle and includes an outer lateral surface with an inner raceway, and first and second flanges extending radially outwards. The second flange includes a larger outer diameter than the first flange and an edge region bent axially towards the first flange. The roller-and-cage assembly is disposed on the inner ring and guided by the first flange and the second flange. The roller-and-cage assembly includes a bearing cage formed as an axially slotted plastic cage and a plurality of roller-type rolling elements inserted into the bearing cage and arranged to roll on the inner raceway. The bearing cage includes a first side ring radially surrounded by the edge region to fix the roller-and-cage assembly in the inner ring, a second side ring, and a plurality of connecting webs.

13 Claims, 3 Drawing Sheets

(56) References Cited

U.S. PATENT DOCUMENTS

| | | | | |
|---|---|---|---|---|
| 2014/0334760 A1* | 11/2014 | Abrahamson | ......... | F16C 33/585 |
| | | | | 384/570 |
| 2015/0043859 A1* | 2/2015 | Pabst | .................... | F16C 33/588 |
| | | | | 29/898.061 |
| 2016/0069392 A1* | 3/2016 | Ince | .................... | F16C 33/4694 |
| | | | | 384/470 |
| 2018/0057903 A1* | 3/2018 | Sabo | .......................... | B21J 5/12 |

FOREIGN PATENT DOCUMENTS

| DE | 102012021687 A1 | | 5/2014 |
|---|---|---|---|
| DE | 102015215005 A1 | | 3/2016 |
| GB | 446905 A | | 5/1936 |
| JP | 2019015373 A | * | 1/2019 |

\* cited by examiner

INNER-RING-FASTENED ROLLER SLEEVE AND METHOD FOR PRODUCING SAME

CROSS-REFERENCE TO RELATED APPLICATIONS

This application is the United States National Phase of PCT Appln. No. PCT/DE2021/100622 filed Jul. 15, 2021, which claims priority to German Application No. DE102020121839.7 filed Aug. 20, 2020, the entire disclosures of which are incorporated by reference herein.

TECHNICAL FIELD

The present disclosure relates to an inner-ring-fastened roller sleeve which can be used for bearing hollow shafts, gear wheels or planet carriers in motor vehicle manual transmissions. The present disclosure further relates to a method for producing such a roller sleeve.

BACKGROUND

In rolling bearing technology, it is generally known that roller sleeves are the radial roller bearing design that has the smallest radial overall height and enable space-saving and easy-to-assemble bearing arrangements with a high radial load-bearing capacity. The best-known and most frequently used design is the housing- or outer-ring-fastened roller sleeve known from DE 195 13 668 A1, for example, which consists of an outer ring that can be inserted into a housing and a roller-and-cage assembly which is inserted into this outer ring. The roller-and-cage assembly is formed by an axially slotted bearing cage made of plastic without a cage lock and made of a plurality of roller-type rolling elements inserted into said bearing cage, which roll on an outer raceway formed by the inner lateral surface of the outer ring. The roller-and-cage assembly is axially guided by means of two flanges which are provided on the axial sides of the outer ring and extend radially inwards.

According to DE 195 13 668 A1, such outer-ring-fastened roller sleeves are produced in such a way that a pot-shaped, rotationally symmetrical drawn part consisting of a base and a jacket is first formed from a round blank punched out of a sheet metal strip by a one- or multi-stage deep-drawing process, with the jacket on its side facing away from the base having a reduced wall thickness. The base is punched out so that a first flange is formed, and the jacket is trimmed in the region of its reduced wall thickness and flanged in the region of the reduced wall thickness to form a second flange. The second flange is then straightened by a perforating process before an axially slotted cage fitted with roller-type rolling elements is inserted without a cage lock after the pot has been formed into a roller sleeve.

An inverse design to this outer-ring-fastened roller sleeve is the shaft- or inner-ring-fastened roller sleeve known, for example, from documents DE 10 2011 007 458 A1 and DE 10 2012 021 687 A1, which, like an outer-ring-fastened roller sleeve, consists of an inner ring fastened on a shaft or axle and a roller-and-cage assembly which is disposed on said inner ring. The roller-and-cage assembly is formed by a bearing cage consisting of two side rings and a plurality of connecting webs as well as a plurality of roller-type rolling elements which are inserted into this bearing cage and which are retained by the bearing cage at regular spacings in the circumferential direction and roll on an inner raceway formed by the outer lateral surface of the inner ring. In this design too, the roller-and-cage assembly is guided axially by two flanges of the same length which are provided on the axial sides of the inner ring and which in this case extend radially outwards.

However, with this design of roller sleeve is not possible to use a cost-effective, axially slotted bearing cage made of plastic without a cage lock, as is the case with outer-ring-fastened roller sleeves, since the ends of the bearing cage are not supported by the outer ring, as is the case with outer-ring-fastened roller sleeves. When assembling transmission parts mounted on inner-ring-fastened roller sleeves, it is therefore possible that the ends of a plastic bearing cage which rest loosely against one another fall out of the inner ring due to the force of gravity, causing problems during transmission assembly due to the cage ends blocking the installation space of the transmission parts. A possible solution to this problem would be to make the open plastic bearing cage lockable with a known cage lock, but none of these cage locks has proven to be durable enough for transmission requirements. Another way to solve the problem described would be to use a closed bearing cage made of sheet steel, which is then inserted into the inner ring before the second flange is flanged and, after the second flange is flanged, is subjected to the necessary heat treatment together with the inner ring. For this, however, the increased manufacturing and material costs for the production of the inner-ring-fastened roller sleeve would have to be accepted.

SUMMARY

The present disclosure provides an inner-ring-fastened roller sleeve, the roller-and-cage assembly of which can be formed with a cost-effective, axially slotted bearing cage made of plastic, the ends of which that rest loosely against one another are not able to fall out of the inner ring due to gravity. The present disclosure also provides a cost-effective method for producing an inner-ring-fastened roller sleeve.

According to the disclosure, a roller sleeve is provided in such a way that by designing the inner ring with a flange that has a larger outer diameter than the other flange on the inner ring and by designing this flange with an edge region that is bent axially toward the roller-type rolling elements, the inner ring can be produced as a finally formed and thermally treated component and an axially slotted plastic cage can be used as the bearing cage, one side ring of which is surrounded radially by the axially bent edge region of the flange with the larger outer diameter and thus fixes the roller-and-cage assembly in the inner ring.

Therefore, in the case of the roller sleeve designed according to the disclosure, one side ring of the bearing cage has a larger outer diameter than the other side ring of the bearing cage and both side rings are connected to one another by connecting webs which are Z-shaped in profile cross-section. The design of the bearing cage with a side ring, the outer diameter of which is smaller than that of the other side ring, permits arrangement of this side ring under the axially bent edge region of the inner ring, the outer diameter of which in turn is smaller than the rolling diameter of the roller-type rolling elements. The Z-shaped profile cross-section of the connecting webs also provides that their contact surfaces, which are adapted to the outer diameter of the roller-type rolling elements, to the roller-type rolling elements are enlarged and thus improve the guidance of the cage. However, it would also be conceivable to connect the two side rings of the bearing cage to one another with simple, sloping connecting webs.

A further feature of the roller sleeve designed according to the disclosure is that the side ring of the bearing cage having the larger outer diameter, radially surrounds the flange on the inner ring having the smaller outer diameter with a gap spacing, and the bearing cage is designed as a rolling-element-guided bearing cage. However, it is also possible to guide the bearing cage on this flange with appropriate surface machining of the circumferential annular surface of the flange having the smaller outer diameter.

The roller sleeve designed according to the disclosure provides that the flange of the inner ring which has a larger outer diameter is formed with a lower material thickness than the flange of the inner ring which has a smaller outer diameter. The lower material thickness of the flange having the larger outer diameter is produced by a corresponding calibration process during the production of the roller sleeve and is intended to avoid folds forming on the flange surfaces of the axially bent edge region of the inner ring when the flange is bent into its final position.

An example embodiment of the roller sleeve designed according to the disclosure provides that the bearing cage be slotted axially centrally through one of its connecting webs and the opposite ends of the bearing cage rest loosely against one another without a connecting lock. This provides stability of the bearing cage. Accepting the disadvantage of being able to equip the roller-and-cage assembly with one less roller-type rolling element, it is also possible to slot the bearing cage axially through one of its pockets.

Because the inner ring is designed with a flange having a larger outer diameter than the other flange on the inner ring, and because this flange is designed with an edge region bent axially toward the roller-type rolling elements, the roller-and-cage assembly can be designed with a cost-effective axially slotted bearing cage made of plastic, one side ring of which can be pushed under the axially bent edge region of the flange with the larger outer diameter in such a way that the ends of the roller-and-cage assembly which rest loosely against one another no longer fall out of the inner ring due to the force of gravity.

The disclosure also provides a method for producing the described roller sleeve, which comprises the following steps:
  a) punching out a round blank from a sheet metal strip made of through-hardening or case-hardening steel;
  b) deep-drawing the round blank to form a pot-shaped starting part, wherein an angled circumferential pot edge forms the flange having a smaller outer diameter and the outer lateral surface of the pot wall forms the inner raceway and the flange of the inner ring having a larger outer diameter;
  c) calibrating that part of the outer lateral surface of the pot wall which forms the flange of the inner ring having a larger outer diameter to a smaller material thickness;
  d) flattening or hammering out the one flange of the inner ring having a smaller outer diameter;
  e) punching out the base of the pot-shaped starting part along the inner lateral surface of the pot wall;
  f) trimming the angled pot edge to the finished diameter of the flange having a smaller outer diameter;
  g) forming the edge region, which is bent axially to fix the bearing cage, on the flange having a larger outer diameter by bend-pressing;
  h) bending the flange having a larger outer diameter by bend-pressing to form the finally formed inner ring having two outwardly directed flanges;
  i) thermally treating the finally formed inner ring by hardening and tempering;
  j) widening the axially slotted plastic bearing cage to such an extent that it can be pushed over the flange having the smaller outer diameter into the inner ring;
  k) overlapping the ends of the bearing cage in such a way that it can be pushed under the axially bent edge region of the flange having the larger outer diameter; and
  l) relaxing the bearing cage in such a way that its ends rest loosely against one another and inserting the roller-type rolling elements into the pockets of the bearing cage formed between the connecting webs.

If greater accuracy of the inner raceway is required, step i) can optionally be followed by surface machining of the inner ring by grinding the inner raceway.

However, as an alternative method for producing the described inner-ring-fastened roller sleeve, it is also possible to replace method steps a) to h) with the following first steps:
  a) producing a hollow-cylindrical starting sleeve by cutting to length a ring section from a tube or from a cartridge-like deep-drawn part made of through-hardening steel;
  b) forming two circumferential grooves in the edge regions of the outer lateral surface of the starting sleeve to produce flanged edges for the flanges;
  c) flanging the edge region, which is bent axially to fix the bearing cage, on one of the edges of the starting sleeve;
  d) producing the finally formed inner ring with the flanges by flanging the axial end regions of the starting sleeve in a radially outward direction;

This would then be followed again by steps i) to l) of the first-mentioned production method.

BRIEF DESCRIPTION OF THE DRAWINGS

An example embodiment of the roller sleeve designed according to the disclosure is explained in more detail below with reference to the accompanying drawings. In the drawings.

DETAILED DESCRIPTION

Figure 2:
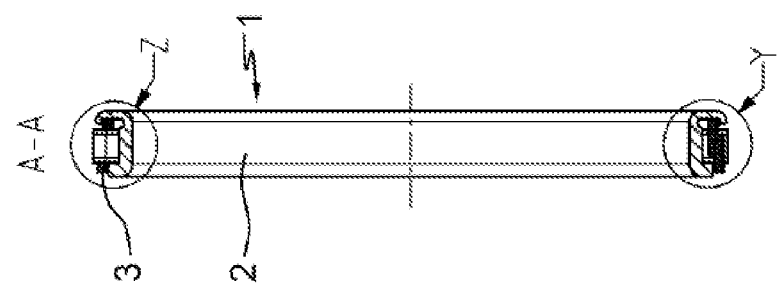
FIG. 2 shows the section A-A according to FIG. 1 through the roller sleeve designed according to the disclosure.
Figure 1:
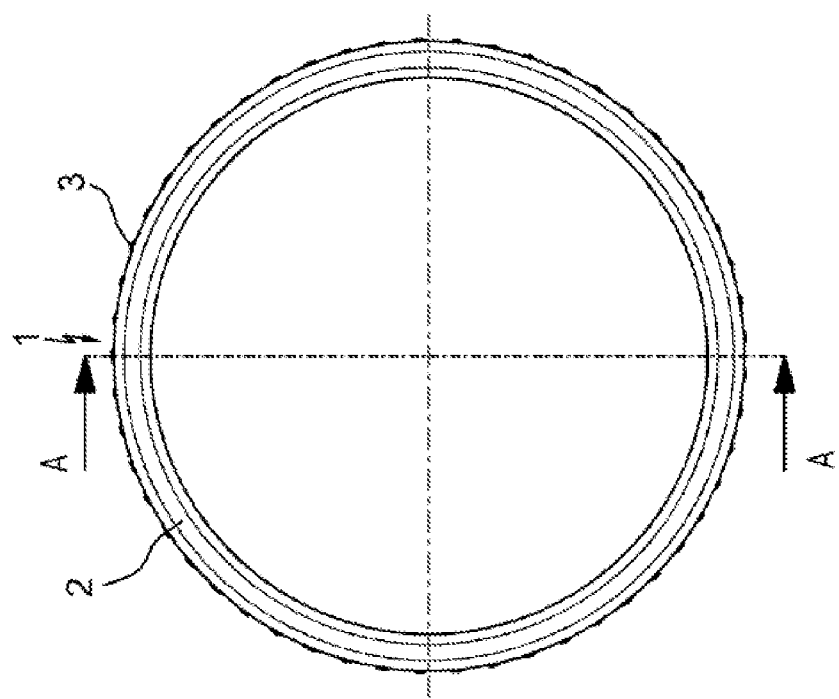
FIG. 1 shows a side view of a roller sleeve designed according to the disclosure.
Figure 3:
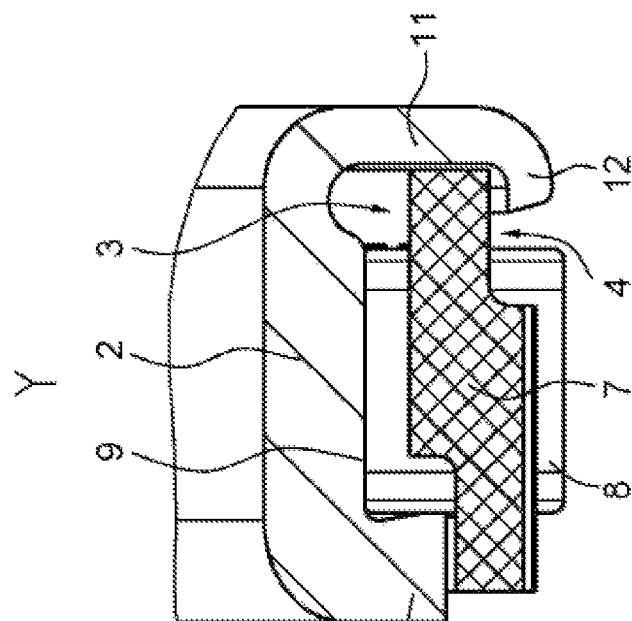
FIG. 3 shows the detail Z of the sectional view through the roller sleeve designed according to the disclosure according to FIG. 2.
Figure 4:
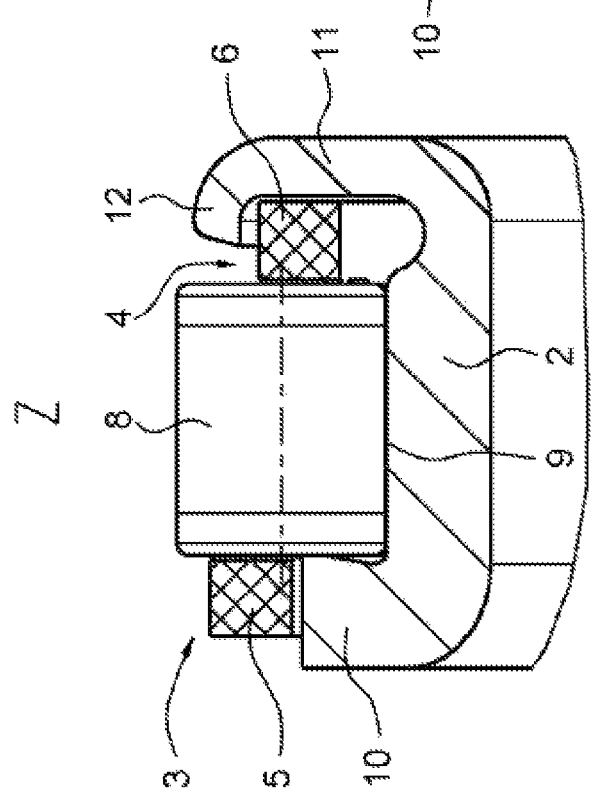
FIG. 4 shows the detail Y of the sectional view through the roller sleeve designed according to the disclosure according to FIG. 2.
Figure 5:
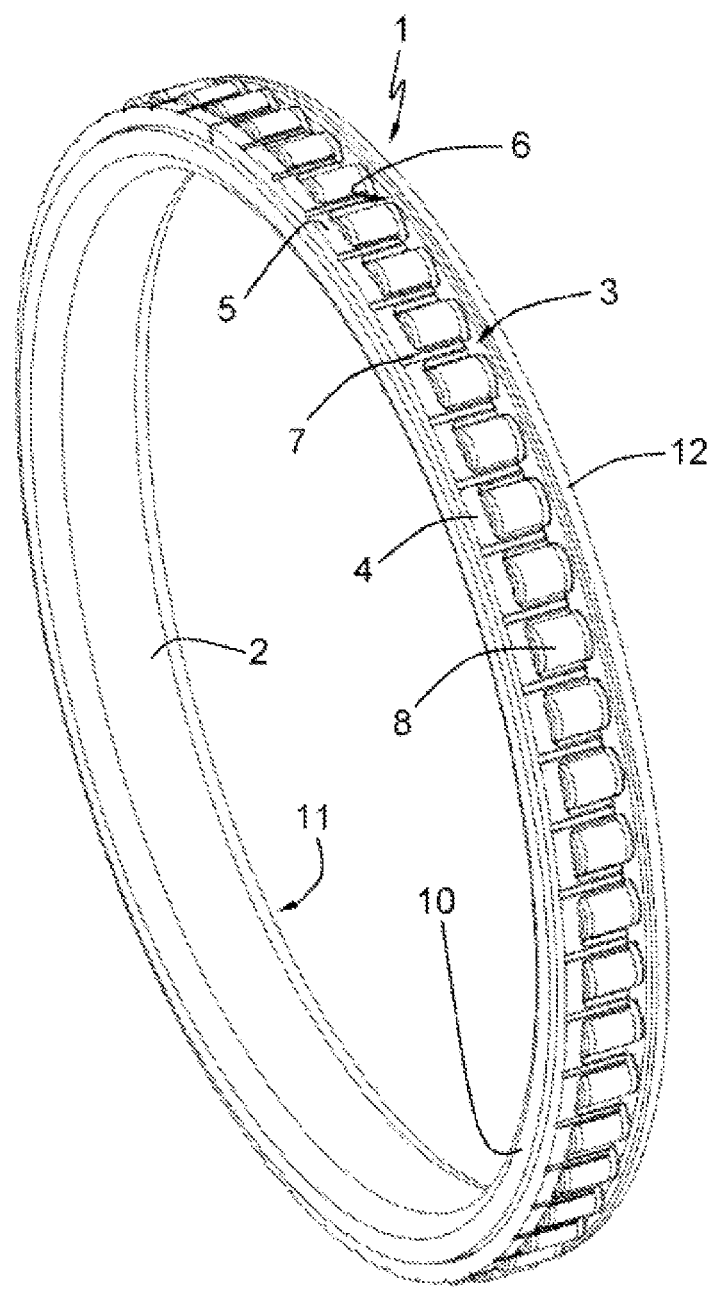
FIG. 5 shows a three-dimensional overall view of the roller sleeve designed according to the disclosure.

FIGS. 1, 2 and 5 each show an inner-ring-fastened roller sleeve 1, which roller sleeve consists of an inner ring 2 fastened to a shaft or axle (not shown) and a roller-and-cage assembly 3 disposed on this inner ring 2. As can be seen in FIGS. 3, 4 and 5, the roller-and-cage assembly 3 is formed by a bearing cage 4 consisting of two side rings 5, 6 and a plurality of connecting webs 7 and from a plurality of roller-type rolling elements 8 which are inserted into this bearing cage 4 and which are retained by the bearing cage 4 at regular spacings in the circumferential direction and roll on an inner raceway 9 formed by the outer lateral surface of the inner ring 2. For the axial guidance of the roller-and-cage assembly 3 in the inner ring 2, two flanges 10, 11 are provided in a known manner on the axial sides of the inner ring 2, which extend radially outwards.

In order to be able to produce the inner ring 2 for such a roller sleeve 1 as a finally formed and thermally treated component and to be able to use a cost-effective axially slotted plastic cage as the bearing cage 4, as can be seen in particular from the illustrations in FIGS. 3 and 4, one flange 11 is formed on the inner ring 2 with a larger outer diameter than the other flange 10 on the inner ring 2, and its edge region 12 is bent axially towards the roller-type rolling elements 8 so that one side ring 6 of the bearing cage 4 is surrounded radially by the axially bent edge region 12 of the flange 11 and fixes the roller-and-cage assembly 3 in the inner ring 2. An angled circumferential pot edge forms the flange 10 having the smaller diameter.

FIGS. 3 and 4 also show that one side ring 5 of the bearing cage 4 has a larger outer diameter than the other side ring 6 of the bearing cage 4 and that both side rings 5, 6 are connected to one another by connecting webs 7 which are Z-shaped in profile cross-section.

It is also clear from FIGS. 3 and 4 that the side ring 5 of the bearing cage 4 having the larger outer diameter radially surrounds the flange 10 on the inner ring 2 having the smaller outer diameter with a gap spacing, and the bearing cage 4 is designed as a rolling-element-guided bearing cage.

In addition, FIGS. 3 and 4 show that the flange 11 of the inner ring 2, which has a larger outer diameter, is designed with a smaller material thickness than the flange 10 of the inner ring 2, which has a smaller outer diameter, for better formability.

Finally, from the upper region of FIG. 5, it can also be seen that the axial slotting of the bearing cage 4 takes place axially centrally through one of its connecting webs 7 and that the opposite ends of the bearing cage 4 rest loosely against one another without a connecting lock.

REFERENCE NUMERALS

1 Roller sleeve
2 Inner ring
3 Roller-and-cage assembly
4 Bearing cage
5 Side ring of 4
6 Side ring of 4
7 Connecting webs of 4
8 Roller-type rolling element
9 Inner raceway
10 Flange on 2
11 Flange on 2
12 Edge region of 11

The invention claimed is:

1. An inner-ring-fastened roller sleeve, comprising:
an inner ring arranged for fastening on a shaft or axle, the inner ring formed as a one-piece component,
a roller-and-cage assembly disposed on the inner ring, the roller-and-cage assembly comprising:
    a bearing cage formed as an axially slotted plastic cage, the bearing cage comprising:
        two side rings,
        a plurality of connecting webs, and
    a plurality of rolling elements inserted into the bearing cage, the rolling elements: i) retained by the bearing cage at regular spacings in a circumferential direction, and ii) roll on an inner raceway formed by an outer lateral surface of the inner ring, and
the roller-and-cage assembly is axially guided via two flanges provided on opposite axial sides of the inner ring and extending radially outwards, and a first one of the two flanges has a larger outer diameter than a second one of the two flanges and, the first one of the two flanges is configured with an edge region bent axially towards the plurality of rolling elements, and one of the two side rings of the bearing cage is radially surrounded by the edge region so as to fix the roller-and-cage assembly in the inner ring.

2. The inner-ring-fastened roller sleeve according to claim 1, wherein a first one of the two side rings of the bearing cage has a larger outer diameter than a second one of the two side rings and the two side rings are connected to one another via the plurality of connecting webs which are Z-shaped in profile cross-section.

3. The inner-ring-fastened roller sleeve according to claim 2, wherein the first one of the two side rings of the bearing cage radially surrounds the second one of the two flanges on the inner ring with a gap spacing, and the bearing cage is configured as a rolling-element-guided bearing cage.

4. The inner-ring-fastened roller sleeve according to claim 1, wherein the first one of the two flanges is formed with a lower material thickness than the second one of the two flanges.

5. The inner-ring-fastened roller sleeve according to claim 1, wherein one of the plurality of connecting webs of the bearing cage is axially slotted such that opposite ends of the bearing cage rest loosely against one another without a connecting lock.

6. A method for producing the inner-ring-fastened roller sleeve of claim 1, comprising:
a) punching out a round blank from a sheet metal strip made of through-hardening or case-hardening steel;
b) deep-drawing the round blank to form a pot-shaped starting part, wherein an angled circumferential pot edge forms the second of the two flanges having the smaller outer diameter and an outer lateral surface of a pot wall forms the inner raceway and the first one of the two flanges of the inner ring having a larger outer diameter;
c) calibrating a part of the outer lateral surface of the pot wall which forms the first one of the two flanges of the inner ring to a smaller material thickness;
d) flattening the first one of the two flanges of the inner ring having a larger outer diameter;
e) punching out a base of the pot-shaped starting part along an inner lateral surface of the pot wall;
f) trimming the angled circumferential pot edge to a finished diameter of the second one of the two flanges having a smaller outer diameter;
g) forming the edge region, which is bent axially to fix the bearing cage, on the first one of the two flanges having a larger outer diameter via bend-pressing;
h) bending the first one of the two flanges having a larger outer diameter by bend-pressing to form a finally formed inner ring having the two flanges;
i) thermally treating the formed inner ring by hardening and tempering;
j) widening the bearing cage so that it can be pushed over the second one of the two flanges having the smaller outer diameter into the inner ring;
k) overlapping ends of the bearing cage so that the bearing cage can be pushed under the edge region of the first one of the two flanges having the larger outer diameter; and
l) Relaxing the bearing cage so that the ends of the bearing cage rest loosely against one another and inserting the rolling elements into pockets of the bearing cage formed between the plurality of connecting webs.

7. The method for producing the inner-ring-fastened roller sleeve according to claim 6, wherein step i) is followed by surface machining of the inner ring by grinding the inner raceway.

8. An inner-ring-fastened roller sleeve comprising:
an inner ring produced as a one-piece and thermally treated component arranged for fastening on a shaft or axle, the inner ring comprising:
an outer lateral surface comprising an inner raceway;
a first flange extending radially outwards; and
a second flange extending radially outwards, the second flange comprising:
a larger outer diameter than the first flange; and
an edge region bent axially towards the first flange; and
a roller-and-cage assembly disposed on the inner ring and guided by the first flange and the second flange, the roller-and-cage assembly comprising:
a bearing cage formed as an axially slotted plastic cage, the bearing cage comprising:
a first side ring radially surrounded by the edge region to fix the roller-and-cage assembly in the inner ring;
a second side ring; and
a plurality of connecting webs; and
a plurality of rolling elements inserted into the bearing cage, the rolling elements being retained by the bearing cage and arranged to roll on the inner raceway.

9. The inner-ring-fastened roller sleeve of claim 8, wherein:
the second side ring has a larger outer diameter than the first side ring; and
the connecting webs are Z-shaped in profile cross-section.

10. The inner-ring-fastened roller sleeve of claim 9, wherein:
the second side ring radially surrounds the first flange with a gap spacing; and
the bearing cage is configured as a rolling-element-guided bearing cage.

11. The inner-ring-fastened roller sleeve of claim 8, wherein the second flange is thinner than the first flange.

12. The inner-ring-fastened roller sleeve of claim 8, wherein:
the bearing cage comprises an axially central slot through one of the plurality of connecting webs; and
ends of the axially central slot rest loosely against one another without a connecting lock.

13. The inner-ring-fastened roller sleeve of claim 1, wherein the two flanges of the inner ring are formed via a metal forming process.

* * * * *